(12) United States Patent
Kinoshita et al.

(10) Patent No.: US 8,571,334 B2
(45) Date of Patent: Oct. 29, 2013

(54) IMAGE COMPRESSION DEVICE, IMAGE COMPRESSION METHOD, AND IMAGE COMPRESSION PROGRAM

(75) Inventors: Yu Kinoshita, Kanagawa (JP); Toshiharu Ooi, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 116 days.

(21) Appl. No.: 13/373,099

(22) Filed: Nov. 4, 2011

(65) Prior Publication Data

US 2012/0134601 A1 May 31, 2012

(30) Foreign Application Priority Data

Nov. 26, 2010 (JP) ................................. 2010-263653

(51) Int. Cl.
*G06K 9/36* (2006.01)
*G06K 9/46* (2006.01)

(52) U.S. Cl.
USPC .......................................... 382/232; 382/251

(58) Field of Classification Search
USPC .......................................... 382/232, 239, 251
See application file for complete search history.

(56) References Cited

U.S. PATENT DOCUMENTS

| | | | | |
|---|---|---|---|---|
| 5,283,656 A | * | 2/1994 | Sugahara | 382/239 |
| 5,502,485 A | * | 3/1996 | Suzuki | 348/231.6 |
| 5,724,097 A | * | 3/1998 | Hibi et al. | 375/240.04 |
| 2001/0024528 A1 | * | 9/2001 | Yokonuma | 382/239 |
| 2005/0018907 A1 | | 1/2005 | Kawanishi et al. | |
| 2007/0110328 A1 | * | 5/2007 | Okada et al. | 382/251 |
| 2009/0009659 A1 | * | 1/2009 | Kawanishi et al. | 348/384.1 |

FOREIGN PATENT DOCUMENTS

JP 2003-199019 A 7/2003

* cited by examiner

*Primary Examiner* — Li Liu
(74) *Attorney, Agent, or Firm* — McGinn IP Law Group, PLLC

(57) ABSTRACT

A high-frequency integrator acquires a first integrated value by integrating a high-frequency component of first image data. A corrector handles second image data, which is obtained when an image processor subjects the first image data to an image process affecting frequency characteristics, and acquires a second integrated value by correcting the first integrated value acquired by the high-frequency integrator in accordance with a change in the frequency characteristics that is brought about by the image process. An encoder calculates, in accordance with the second integrated value acquired by the corrector, a quantization scale for compressing the second image data acquired by the image processor to a predefined number of bytes at once, and compresses the second image data accordingly.

4 Claims, 4 Drawing Sheets

IMAGE COMPRESSION DEVICE, IMAGE COMPRESSION METHOD, AND IMAGE COMPRESSION PROGRAM

CROSS-REFERENCE TO RELATED APPLICATIONS

The disclosure of Japanese Patent Application No. 2010-263653 field on Nov. 26, 2010 including the specification, drawings, and abstract is incorporated herein by reference in its entirety.

BACKGROUND

The present invention relates to an image compression technology, and more particularly to a technology for compressing an image into JPEG format.

In recent years, digital cameras have become increasingly sophisticated, for instance, by providing a huge number of pixels and offering a continuous shooting mode. It is therefore demanded that a high-speed process be performed to compress picked-up images.

A JPEG compression method for compressing image data to a predefined number of bytes at once is disclosed in Japanese Unexamined Patent Publication No. 2003-199019. This method integrates a high-frequency component of image data to obtain an integrated value, calculates, in accordance with the obtained integrated value, the number of bytes resulting when the image data is compressed, and calculates a quantization scale for compressing the image data to the predefined number of bytes at once. Next, this method creates a quantization table, which is used to compress the image data in accordance with the calculated quantization scale, and then compresses the image data with the created quantization table (claim 1).

The quantization scale is also referred to as the Q scale or Q value. It is used to calculate the quantization table (e.g., Q table or DQT), which is used when image data is compressed into JPEG format. It ranges in value from 1 to 100. The smaller the Q scale, the higher the compression ratio.

Further, when the image data derived from predetermined image signal processing is to be compressed, the method disclosed in Japanese Unexamined Patent Publication No. 2003-199019 integrates the high-frequency component of the processed image data (claim 4).

SUMMARY

Digital cameras developed in recent years subject picked-up original images to various image processes. For example, digital cameras offering, for instance, a "soft skin mode" or "night view mode" subject original images to an image process specific to a selected mode, and then record the resultant images onto a memory card or other recording medium. Further, digital cameras built in mobile phones in particular perform a resizing process on original images in order to obtain images in a plurality of different sizes, such as an image to be confirmed by a photographer, an image to be stored, and a thumbnail image.

The above-mentioned various image processes change the frequency characteristics of images. Therefore, when images obtained by subjecting original images to the various image processes are to be compressed, operation can be performed on each of the images, for example, to integrate the high-frequency component and calculate the quantization scale as described in Japanese Unexamined Patent Publication No. 2003-199019.

However, if each of the original images is subjected to a plurality of different image processes and then operated on to integrate the high-frequency component, a significant amount of time is required for overall processing.

The present invention has been made in view of the above circumstances and provides a technology for achieving image compression at a high speed.

According to one aspect of the present invention, there is provided a method for compressing second image data, which is obtained when first image data is subjected to image processing that changes the frequency characteristics. The method acquires a first integrated value by integrating a high-frequency component of the first image data, and obtains a second integrated value by correcting the first integrated value in accordance with a change in the frequency characteristics, which is brought about by the image processing. Next, the method determines, in accordance with the second integrated value, the number of bytes resulting when the second image data is compressed, calculates, in accordance with the determined number of bytes, a quantization scale for compressing the second image data to a predefined number of bytes at once, and compresses the second image data by using the calculated quantization scale.

Even when the above-described method is implemented in the form, for instance, of a system, a device, or a program for causing a computer to exercise the above-described method, it is still effective as an aspect of the present invention.

A technology according to an aspect of the present invention makes it possible to achieve image compression at a high speed.

BRIEF DESCRIPTION OF THE DRAWINGS

An embodiment of the present invention will be described in detail based on the following figures, in which.

DETAILED DESCRIPTION

Figure 1:
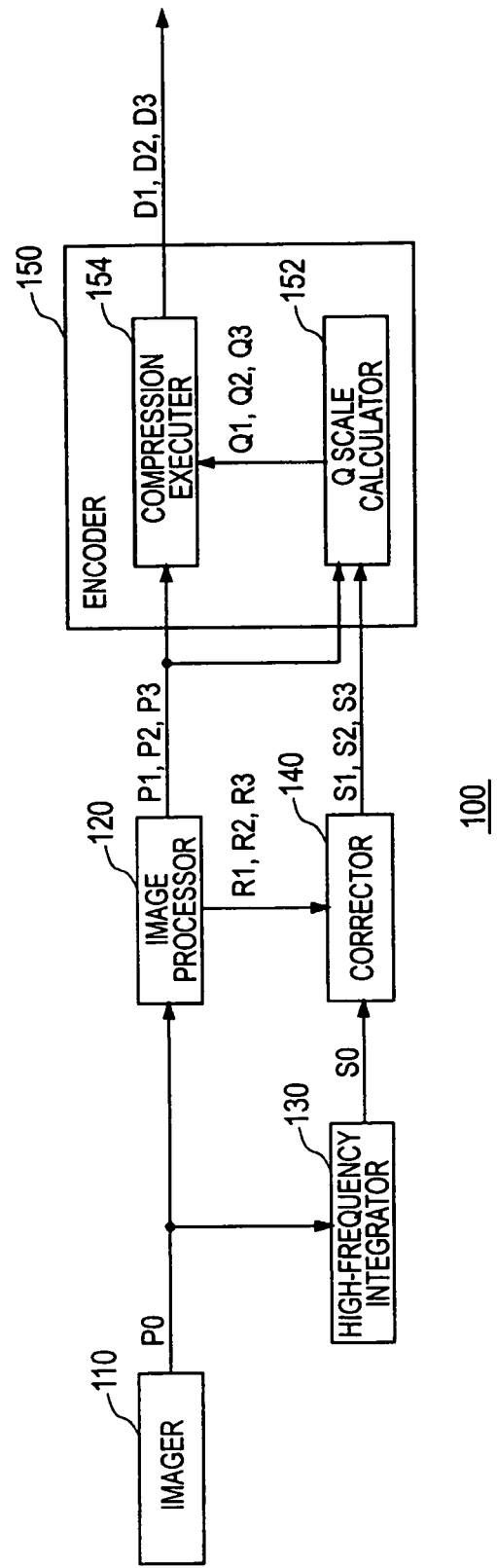
FIG. 1 is a diagram illustrating a digital camera according to an embodiment of the present invention.

In the following description and the drawings, omissions and simplifications are made as necessary for the clarification of explanation. Further, hardware for various elements indicated in the drawings as functional blocks that perform various processes can be implemented by a CPU, a memory, or other circuit while software for such elements can be implemented, for instance, by a program loaded into a memory. Therefore, it is to be understood by those skilled in the art that the functional blocks are not limited to hardware or software, but can be variously implemented by hardware only, by software only, or by a combination of hardware and software.

Furthermore, the above-mentioned program can be stored on various types of non-transitory computer readable media and supplied to a computer. The non-transitory computer readable media include various types of tangible storage media. More specifically, the non-transitory computer readable media include a magnetic recording medium (e.g., flexible disk, magnetic tape, or hard disk drive), a magnetooptical recording medium (e.g., magnetooptical disk), a CD-ROM (read only memory), a CD-R, a CD-R/W, and a semiconductor memory (e.g., mask ROM, PROM (programmable ROM), EPROM (erasable PROM), flash ROM, or RAM (random access memory)). The program may be supplied to the computer by using various types of transitory computer readable media. The transitory computer readable media include an electrical signal, an optical signal, and an electromagnetic wave. The transitory computer readable media can supply the program to the computer through an electric wire, optical fiber, or other wired communication path or a wireless communication path.

FIG. 1 is a diagram illustrating a digital camera 100 according to an embodiment of the present invention. The digital camera includes an imager 110, an image processor 120, a high-frequency integrator 130, a corrector 140, and an encoder 150.

The imager 110 picks up an image of a subject, acquires first image data P0 (hereinafter may be simply referred to as the image data), and outputs the image data to the image processor 120 and high-frequency integrator 130.

The image processor 120 performs a plurality of different image processes on the first image data P0 to acquire a plurality of second image data (image data P1, image data P2, and image data P3). It is assumed as an example that the image processes performed by the image processor 120 are three resolution conversion processes (resizing processes), which differ in resolution conversion ratio (scaling factor).

The image processor 120 not only outputs the second image data P1, P2, P3 to the encoder 150, but also outputs resolution conversion ratios R1, R2, R3, which are respectively used to derive the image data P1, P2, P3 from the first image data P0, to the corrector 140.

The high-frequency integrator 130 integrates the high-frequency component of the first image data P0. For example, the high-frequency integrator 130 extracts the high-frequency component from the first image data P0, determines the absolute value of the extracted high-frequency component, and obtains an integrated value S0 by integrating the determined absolute value.

Figures 2, 3:
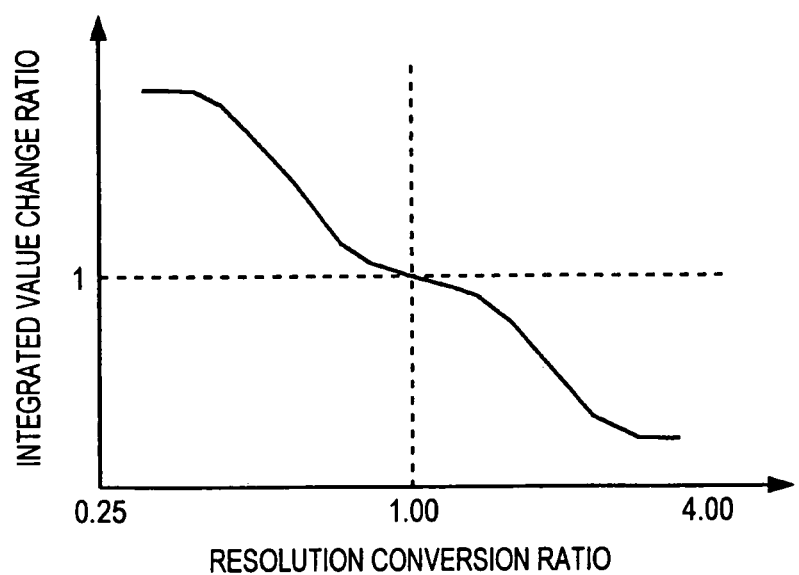
FIG. 2 is a diagram illustrating an exemplary filter that is used by a high-frequency integrator in the digital camera shown in FIG. 1.
FIG. 3 is a diagram illustrating a process performed by a corrector in the digital camera shown in FIG. 1.

In the digital camera 100 according to the present embodiment, the high-frequency integrator 130 uses an ON-center two-dimensional filter shown in FIG. 2 when extracting the high-frequency component from the image data P0. The ON-center two-dimensional filter calculates the sum of a value obtained by multiplying a pixel of interest by a positive coefficient and a value obtained by multiplying the pixels surrounding the pixel of interest by a negative coefficient. In FIG. 2, "H" and "L" are the coefficients that multiply the pixels. The "H" coefficient is a positive value, whereas the "L" coefficient is a negative value. In the present embodiment, the high-frequency integrator 130 uses the two-dimensional filter shown in FIG. 2 to output the sum of pixel values, which are obtained through the use of the filter coefficients, as a frequency component integrated value of a center pixel.

When the two-dimensional filter shown in FIG. 2 is used, horizontal and vertical high-frequency components can be simultaneously determined.

Further, the use of the two-dimensional filter makes it possible to calculate the frequency component integrated value of the pixel of interest when the number of vertical lines of the two-dimensional filter is stored in memory. Hence, the high-frequency integrator 130 can calculate the frequency component integrated value while storing the image data P0 in a calculation memory (not shown) without having to wait until the whole image data P0 is stored in the calculation memory. This increases the speed of processing. Furthermore, the calculation memory in the high-frequency integrator 130 is only required to have a capacity of storing several lines necessary for filter processing. Hence, the capacity of the calculation memory for acquiring the integrated value S0 can be reduced.

The corrector 140 corrects the integrated value S0, which is acquired from the high-frequency integrator 130, in accordance with changes in the frequency characteristics, which are brought about by various image processes performed by the image processor 120, acquires second integrated values (S1, S2, S3), which respectively relate to the image data P1, P2, P3, and outputs the second integrated values (S1, S2, S3) to the encoder 150.

In the present embodiment, the corrector 140 retains a table (not shown) that indicates the correspondence relationship between a resolution conversion ratio for a resolution conversion process and the change ratio of the integrated value of a high-frequency component (hereinafter simply referred to as the "integrated value change ratio"), and corrects the integrated value S0 in accordance with the table.

FIG. 3 shows an example of the table retained by the corrector 140. As indicated in the table shown in FIG. 3, the higher the resolution conversion ratio, the lower the integrated value change ratio. More specifically, when an enlargement process (resolution change ratio>1) is performed as an image process, the integrated value change ratio decreases with an increase in an enlargement ratio. When, on the other hand, a reduction process (frequency integrated value change ratio<1) is performed as an image process, the integrated value change ratio increases with an increase in a reduction ratio (a decrease in the resolution change ratio).

The table shown in FIG. 3 is dependent, for instance, on the characteristics of an imaging device (not shown) included in the imager 110, which acquires the image data P0, but can be set up at a design stage by a designer of the digital camera 100 or acquired, for instance, from simulation results.

The corrector 140 references the table shown in FIG. 3, acquires integrated value change ratios, which respectively correspond to resolution change ratios R1, R2, R3 received from the image processor 120, and multiplies the integrated value S0 by the acquired integrated value change ratios to obtain integrated values S1, S2, S3.

The encoder 150 performs compression in JPEG format and includes a Q scale calculator 152 and a compression executer 154.

The Q scale calculator 152 calculates, in accordance with the integrated values S1, S2, S3 received from the corrector 140, quantization scales Q1, Q2, Q3 for compressing the image data P1, P2, P3 to a predefined number of bytes at once, and outputs the calculated quantization scales Q1, Q2, Q3 to the compression executer 154.

More specifically, the Q scale calculator 152 first determines, in accordance with the integrated value S1, the number of bytes B1 resulting when the image data P1 is compressed.

Figure 4:
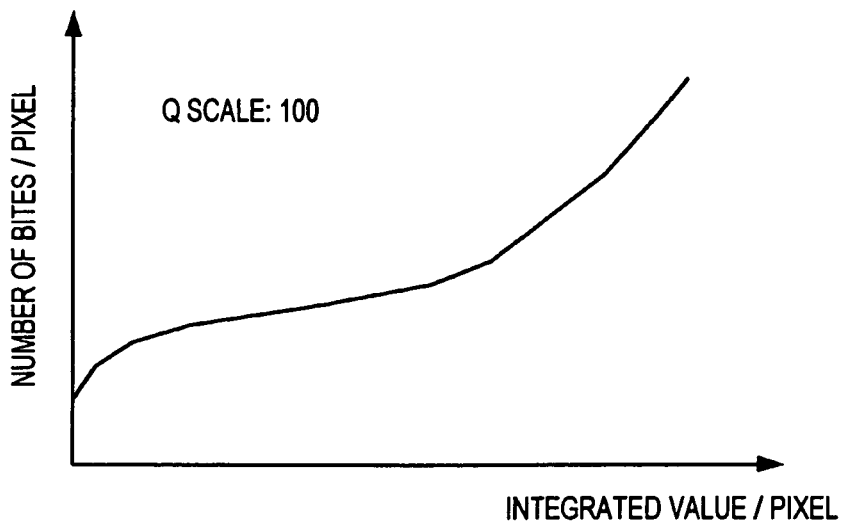
FIG. 4 is a first diagram illustrating a process performed by a Q scale calculator in the digital camera shown in FIG. 1.

FIG. 4 relates to a case where the Q scale is 100 and shows the relationship between the integrated value of an image's high-frequency component and the number of bytes resulting when the image is compressed. In FIG. 4, the horizontal axis indicates the integrated value per pixel and the vertical axis indicates the number of bytes per pixel that prevails after compression. The Q scale calculator 152 references internal data corresponding to FIG. 4 and determines, in accordance with the integrated value S1 and the number of pixels of the image data P1, the number of bytes per pixel (hereinafter referred to as the "byte count B1") prevailing after the compression of the image data P1 in the case where the Q scale is 100.

Next, in accordance with the determined byte count B1, the Q scale calculator 152 calculates the quantization scale Q1 for compressing the image data P1 to the predefined number of bytes at once.

Figure 5:
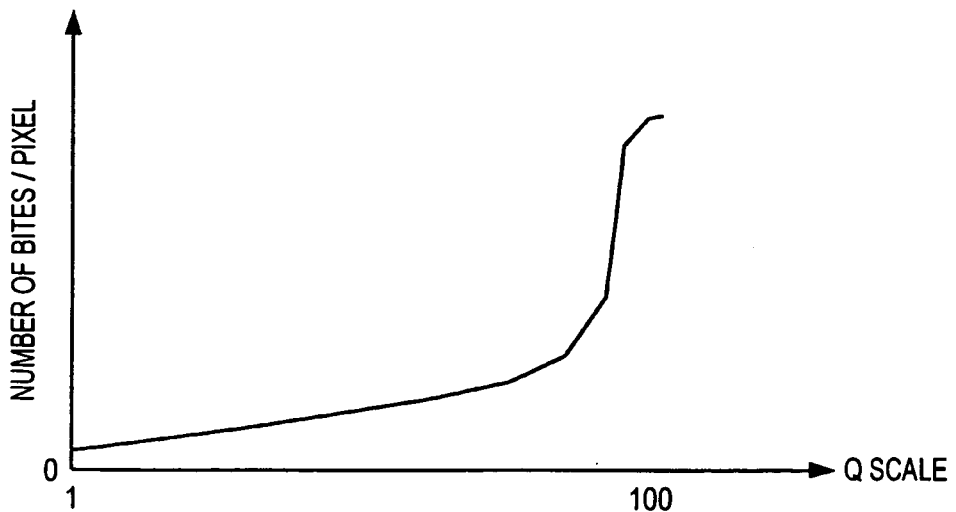
FIG. 5 is a second diagram illustrating a process performed by the Q scale calculator in the digital camera shown in FIG. 1.

FIG. 5 shows the relationship between the Q scale used for the compression of image data (horizontal axis) and the number of bytes per pixel prevailing after the compression of the image data (vertical axis). The curve shown in FIG. 5 varies with the amount of high-frequency component included in the image data. When the amount of high-frequency component increases, the curve shifts upward, that is, in the direction of increasing the number of bytes per pixel. When, on the other hand, the amount of high-frequency component decreases, the curve shifts downward, that is, in the direction of decreasing the number of bytes per pixel.

The Q scale calculator 152 retains internal data that relates to internal data having an average high-frequency component and corresponds to the curve shown in FIG. 5, and references the internal data to calculate the quantization scale Q1.

More specifically, when the quantization scale Q1 is to be determined from the curve shown in FIG. 5, the Q scale calculator 152 first references the curve shown in FIG. 5 and determines the number of bytes per pixel prevailing after the compression of the image data P1 (hereinafter referred to as the "byte count B2") in accordance with Equation (1) below. Actually, this process is performed in accordance with the byte count B1 to scale the predefined target number of bytes onto the curve shown in FIG. 5.

$$B2 \approx \text{predefined target number of bytes} \times g(100) \div B1 \qquad (1)$$

where g( ) is a function that uses a Q scale corresponding to the curve shown in FIG. 5 as a parameter.

Next, the Q scale calculator 152 acquires the quantization scale corresponding to the byte count B2 calculated from Equation (1), which is included in the internal data correspondent to the curve shown FIG. 5, as the quantization scale Q1.

The Q scale calculator 152 calculates the quantization scales Q2 and Q3 in the same manner as described above.

The above-mentioned "predefined number of bytes" is predefined for each of the image data P1, P2, P3. The predefined number of bytes for each of the image data P1, P2, P3 either remains the same or varies from each other depending on the specifications for the digital camera 100.

The compression executer 154 compresses the image data P1, P2, P3 with the quantization scales Q1, Q2, Q3 calculated by the Q scale calculator 152 to obtain compressed image data D1, D2, D3.

More specifically, the compression executer 154 creates the quantization table for compressing the image data P1 by using the quantization scale Q1, and compresses the image data P1 with the created quantization table to obtain the compressed image data D1. The compression executer 154 also obtains the compressed image data D2, D3 by performing the same process as described above.

These compressed image data D1, D2, D3 are then subjected to different subsequent processes depending on their use. For example, the compressed image data D1 appears on a display to be confirmed by a photographer. The compressed image data D2 is recorded on a memory card (not shown) or other recording medium for the digital camera 100. The compressed image data D3 is recorded on the recording medium together with the compressed image data D2 as a thumbnail image.

Figure 6:
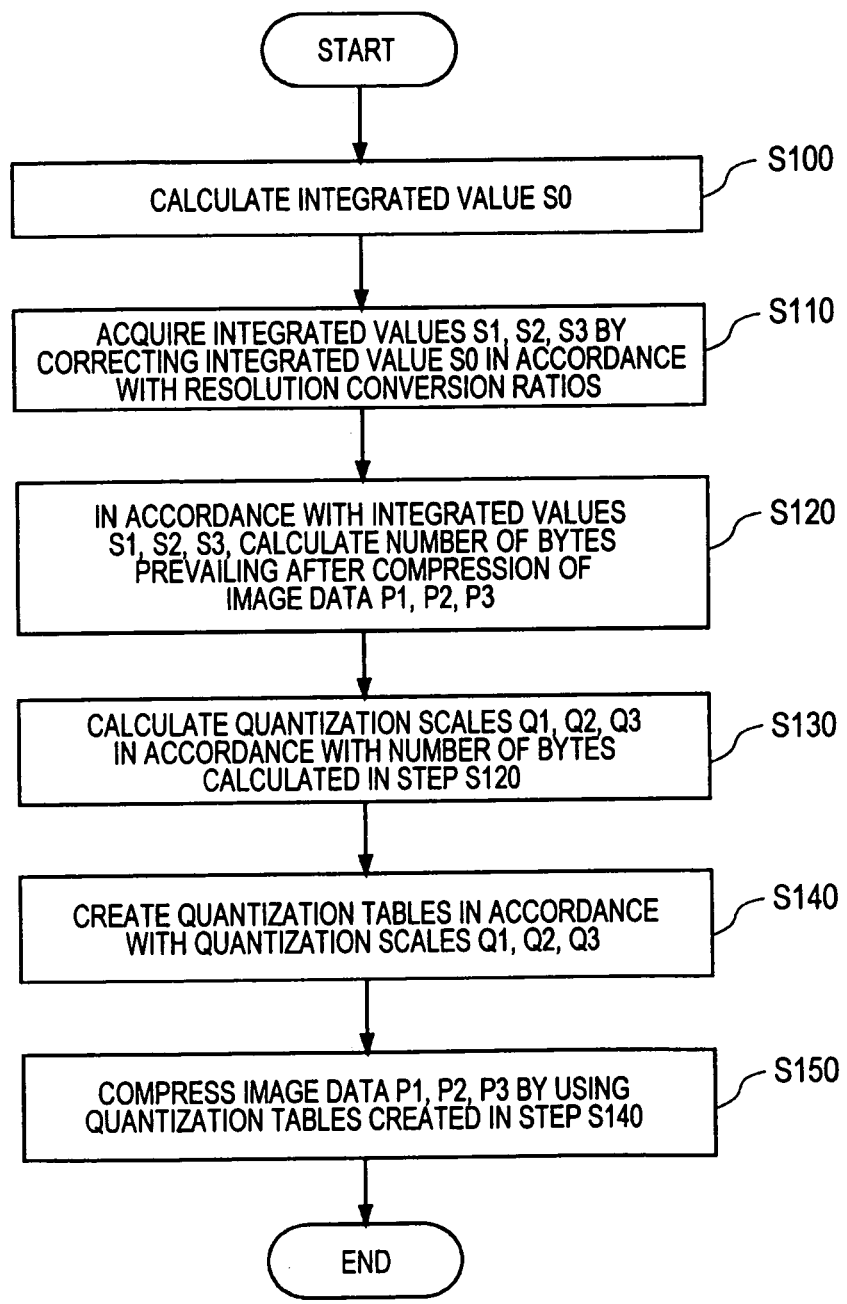
FIG. 6 is a flowchart illustrating a process performed in the digital camera shown in FIG. 1.

FIG. 6 is a flowchart illustrating a process performed in the digital camera 100. First of all, the high-frequency integrator 130 acquires the integrated value S0 by integrating the high-frequency component of the image data P0, which is obtained when the imager 110 picks up an image of the subject (step S100). Next, the corrector 140 acquires the integrated values S1, S2, S3 by correcting the integrated value S0 in accordance with the resolution conversion ratios R1, R2, R3, which are used when the image processor 120 acquires the image data P1, P2, P3 by performing the resolution conversion process on the image data P0 (step S110). Next, the Q scale calculator 152 in the encoder 150 calculates, in accordance with the integrated values S1, S2, S3 calculated by the corrector 140 in step S110, the number of bytes prevailing after the compression of the image data P1, P2, P3 in the case where the Q scale is 100 (step S120). Further, the Q scale calculator 152 calculates, in accordance with the calculated number of bytes, the quantization scales Q1, Q2, Q3 for respectively compressing the image data P1, P2, P3 to the predefined number of bytes at once (step S130). The compression executer 154 creates quantization tables for respectively compressing the image data P1, P2, P3 in accordance with the quantization scales Q1, Q2, Q3 calculated by the Q scale calculator 152, and compresses the image data P1, P2, P3 with the created quantization tables (steps S140 and S150).

As described above, when the quantization scales Q1, Q2, Q3 are to be determined to compress the image data P1, P2, P3, which are different in size and acquired by resizing the image data P0 obtained by picking up an image, the digital camera 100 according to the present embodiment corrects the integrated value S0 of the high-frequency component of the image data P0 to obtain the integrated values S1, S2, S3 of the high-frequency components of the image data P1, P2, P3. Consequently, the integrated value of the high-frequency component is directly determined from each image data to be compressed. As a result, the speed of processing can be increased.

While the invention has been described in conjunction with a preferred embodiment, it considered in all respects to be illustrative, and not restrictive. It should be understood that various modifications will become apparent to those of ordinary skill in the art and that such modifications are intended to be included within the scope of the invention.

For example, the digital camera 100 according to the embodiment described above is such that the presently disclosed technology is applied to the compression of image data obtained by resizing. The presently disclosed technology can also be applied to the compression of image data derived from a sharpness process or other image process affecting the frequency characteristics.

In the digital camera 100, the integrated value S0 of the high-frequency component is determined from the image data P0, which is obtained when the imager 110 picks up an image of the subject, and then corrected to obtain the integrated values S1, S2, S3. In this instance, the speed of processing may be increased, for instance, by determining the integrated value of the high-frequency component from preview image data, which is used immediately before imaging, correcting, after imaging, the integrated value of the high-frequency component, which was determined from the preview image data, and acquiring the integrated values S1, S2, S3 of the image data P1, P2, P3 obtained by the image processor 120. When the above correction is to be made, the relationship to an image process for converting the preview image data to the image data P1, which corresponds to the curve shown FIG. 3, may be used. The same holds true for the image data P2, P3.

Another alternative is to determine the integrated value of the high-frequency component from one of the three image data P1, P2, P3 (e.g., image data P1), which will be actually compressed, calculate the quantization scale for the image data P1 in accordance with the determined integrated value, perform image data compression, and obtain the integrated values of the high-frequency components of the other image data (P2, P3) by correcting the integrated value of the high-frequency component of the image data P1. This makes it possible to reduce the memory capacity because a memory for storing the image data P0 is no longer needed.

When the integrated value of the high-frequency component is to be determined from one of the three image data, it is preferred that the image data having the smallest size (e.g., thumbnail image data) be selected. This will further raise the processing speed and reduce the memory capacity.

The curves shown in FIGS. 3, 4, and 5 are statistically determined. Therefore, they may cause some errors. An alternative approach for compressing an image to the predefined target number of bytes with increased accuracy is to compress each image data by using a method provided by the digital camera 100, recalculate the Q scale in accordance with the result of compression (the number of bytes of the compressed image data), and recompress each image data accordingly.

What is claimed is:

1. An image compression device comprising:
    a high-frequency integrator circuit that acquires a first integrated value by integrating a high-frequency component of first image data;
    a corrector circuit that handles second image data, which is obtained by subjecting the first image data to an image process affecting frequency characteristics, and acquires a second integrated value by correcting the first integrated value acquired from the high-frequency integrator circuit in accordance with a change in the frequency characteristics;
    a quantization scale calculator circuit that inputs the second image data, determines, in accordance with the second integrated value acquired from the corrector circuit, the number of bytes resulting when the second image data is compressed, and calculates, in accordance with the determined number of bytes, a quantization scale for compressing the second image data to a predefined number of bytes at once; and
    a compression executer circuit that compresses the second image data by using the quantization scale calculated by the quantization scale calculator circuit.

2. The image compression device according to claim 1, further comprising:
    an imager that acquires the first image data by picking up an image of a subject; and
    an image processor that generates the second image data by performing the image process on the first image data.

3. An image compression method comprising the steps of:
    when compressing second image data, which is obtained by subjecting first image data to an image process affecting frequency characteristics, acquiring a first integrated value by integrating a high-frequency component of the first image data;
    acquiring a second integrated value by correcting the first integrated value in accordance with a change in the frequency characteristics;
    determining, in accordance with the second integrated value, the number of bytes resulting when the second image data is compressed;
    calculating, in accordance with the determined number of bytes, a quantization scale for compressing the second image data to a predefined number of bytes at once; and
    compressing the second image data by using the calculated quantization scale.

4. A non-transitory computer readable medium storing a program causing a computer to execute a process for image compression, the process comprising:
    when compressing second image data, which is obtained by subjecting first image data to an image process affecting frequency characteristics, acquiring a first integrated value by integrating a high-frequency component of the first image data;
    acquiring a second integrated value by correcting the first integrated value in accordance with a change in the frequency characteristics;
    determining, in accordance with the second integrated value, the number of bytes resulting when the second image data is compressed;
    calculating, in accordance with the determined number of bytes, a quantization scale for compressing the second image data to a predefined number of bytes at once; and
    compressing the second image data by using the calculated quantization scale.

* * * * *